United States Patent [19]
Wallace

[11] 3,759,165
[45] Sept. 18, 1973

[54] DEVICE FOR HOLDING TORTILLA DURING THE COOKING THEREOF

[76] Inventor: David C. Wallace, 1245 Peralta Dr., San Jose, Calif. 95120

[22] Filed: Dec. 8, 1971

[21] Appl. No.: 205,847

[52] U.S. Cl............ 99/427, 99/409, 99/416, 99/439, 99/448, 99/450
[51] Int. Cl.............................. A47j 43/18
[58] Field of Search.............. 99/432, 353, 386, 99/402, 403, 404, 421 A, 426, 427, 450, 409, 416, 439, 448; 126/9 B

[56] References Cited
UNITED STATES PATENTS

| | | | |
|---|---|---|---|
| 2,719,480 | 10/1955 | Prickett et al. | 99/426 |
| 2,778,294 | 1/1957 | Ulloa | 99/426 |
| 2,967,474 | 1/1961 | Ford | 99/404 |
| 3,020,826 | 2/1962 | Silva | 99/426 |
| 3,511,172 | 5/1970 | Jones | 99/426 |
| 3,537,389 | 11/1970 | Villarreal | 99/427 |
| 3,602,130 | 8/1971 | Perez | 99/404 |
| 3,653,337 | 4/1972 | Hanson | 99/426 |
| 3,667,372 | 6/1972 | Hilvitz et al. | 99/404 |

Primary Examiner—William P. Price
Assistant Examiner—Arthur O. Henderson
Attorney—Jack M. Wiseman

[57] ABSTRACT

A device for holding folded-over tortillas while the tortillas are immersed in oil during the cooking thereof. The device comprises an inner support against which folded spaced tortillas are placed. The inner support is disposed within an outer retainer which serves to retain the tortillas against the inner support. A suitable handle carries the inner support and outer retainer so that an operator can immerse the tortillas in hot oil for cooking, such as in a deep fry process. Means are provided on the handle for rotating the inner support and outer retainer 180° for a flip-over action in cooking the folded-over tortillas. The inner support and the outer retainer are constructed so that the tortillas are cooked in a preformed configuration suitable for use in the preparation of tacos.

3 Claims, 4 Drawing Figures

INVENTOR
DAVID C. WALLACE

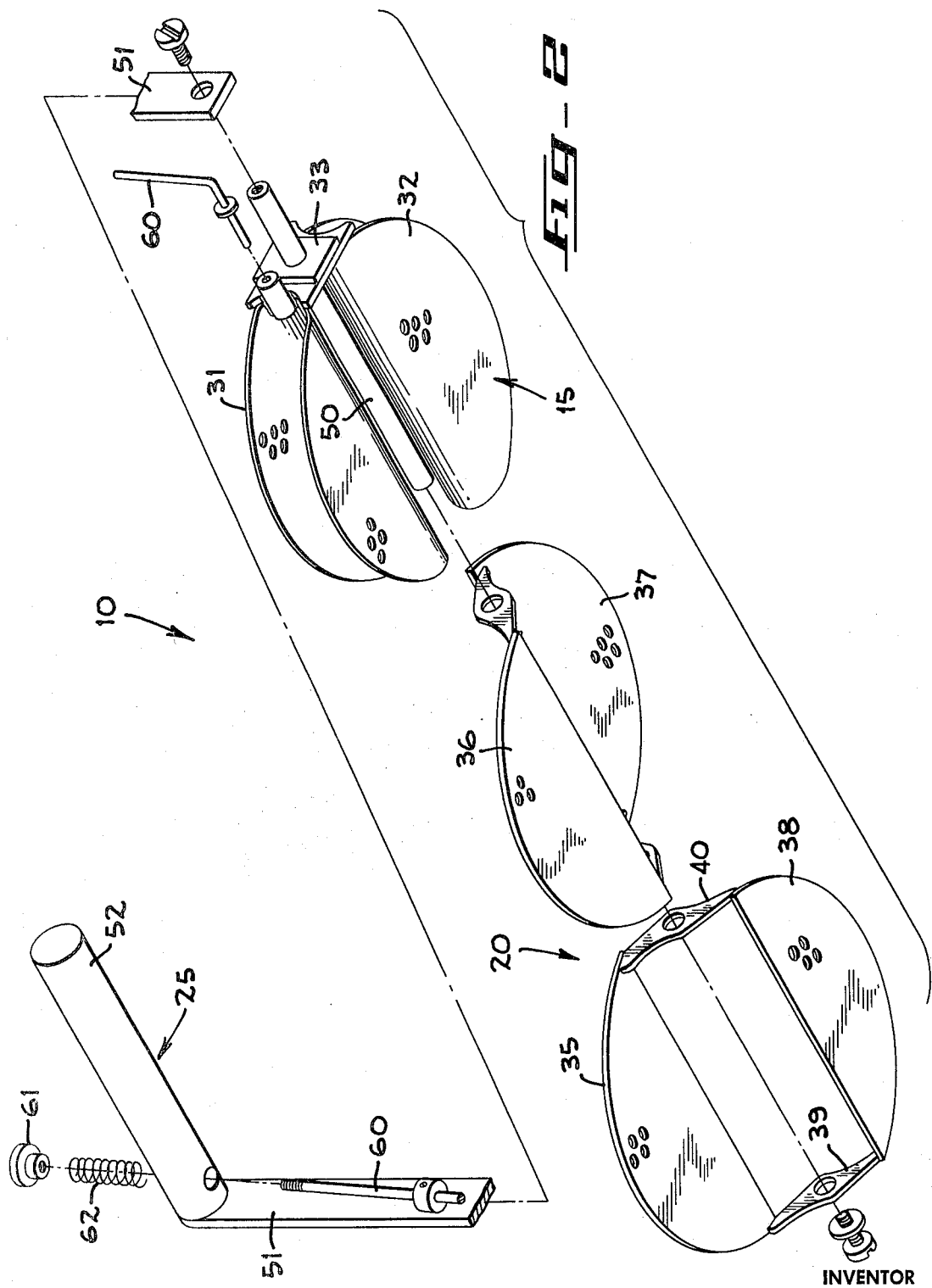

DEVICE FOR HOLDING TORTILLA DURING THE COOKING THEREOF

BACKGROUND OF THE INVENTION

Tacos are prepared by cooking a tortilla, which initially has a disc shape. After the tortilla is cooked and assumes a folded-over configuration, ingredients such as meat, cheese, vegetables and the like are placed in the folded-over tortilla. The tortilla is folded over diametrically to contain the ingredients therein. Heretofore, it was difficult and time consuming to prepare the tortilla. Generally, this was done by using two spatulas, or similar cooking instruments, to fold and form the tortilla while the tortilla was being cooked. The tortillas were formed one at a time with the cook in constant attendance to achieve the desired fold-over configuration.

SUMMARY OF THE INVENTION

A device for holding a tortilla during the cooking thereof comprising an inner support and outer retainer for holding a tortilla while immersed in a deep fry or the like and constructed to hold a folded-over tortilla during the cooking thereof.

By virtue of the present invention, the use of cumbersome spatulas or other cooking utensils to hold the tortilla and to produce a folded-over tortilla has been obviated. The device holds a pair of folded-over tortillas during the cooking operation. Thus, the cooking of the tortilla has been facilitated.

DESCRIPTION OF THE DRAWINGS

FIG. 2 is an exploded view of the device shown in FIG. 1.

DESCRIPTION OF THE PREFERRED EMBODIMENT

Figure 4:
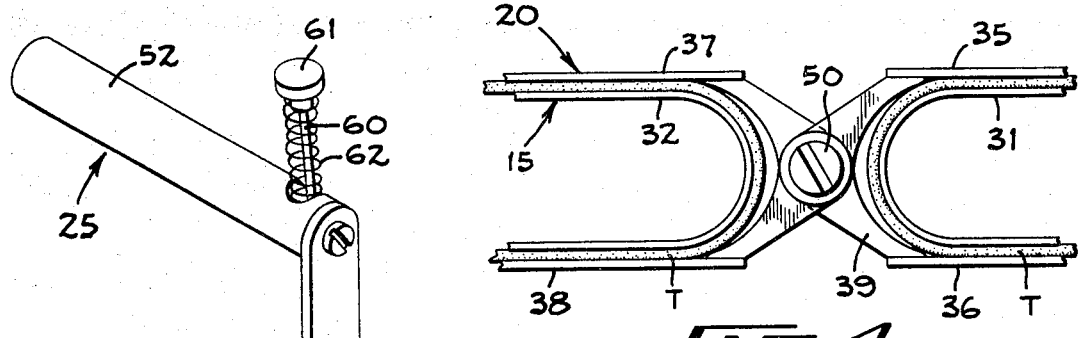
FIG. 4 is a fragmentary opposite end view of the device shown in FIGS. 1 – 3 illustrated with folded-over tortillas disposed therein.
Figure 1:
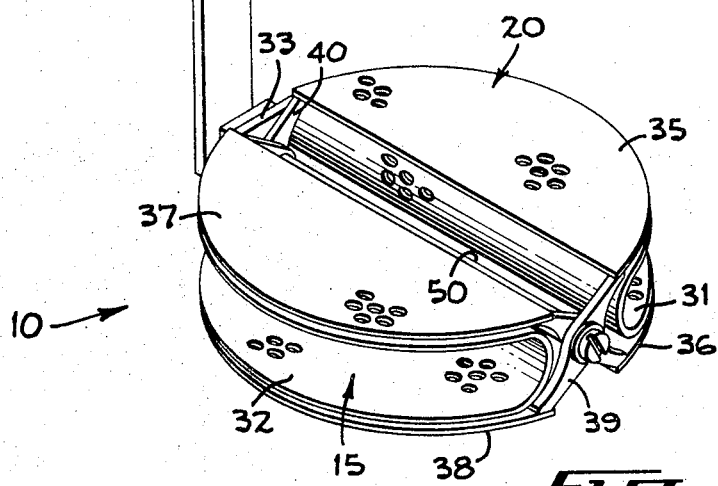
FIG. 1 is a perspective view of the tortilla holding device of the present invention.
Figure 3:
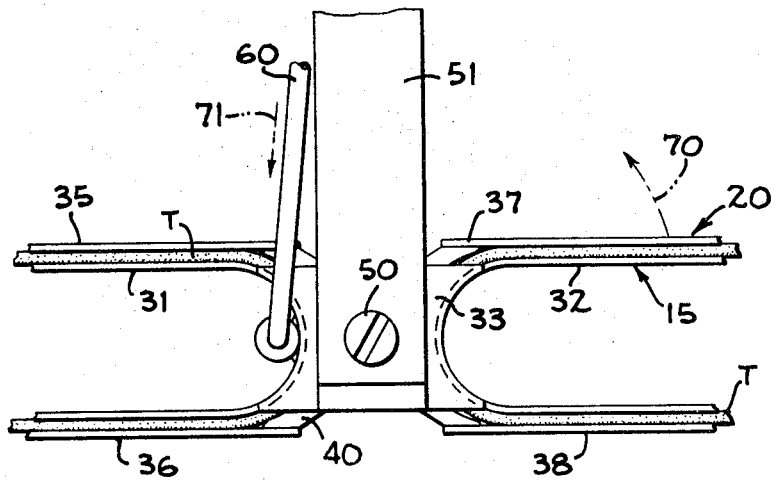
FIG. 3 is a fragmentary end view of the device shown in FIGS. 1 and 2.

Illustrated in FIGS. 1 and 2 is a device 10 for holding folded-over tortillas T (FIGS. 3 and 4) while immersed in oil or the like for cooking. The device 10 comprises an inner support 15 against which folded-over tortillas T are disposed. The inner support 15 is disposed within an outer retainer 20. A handle 25 is attached to both the inner support 15 and the outer retainer 20.

The inner support 15 comprises spaced back-to-back apertured members or tortilla supports 31 and 32 joined at the peripheral walls thereof by an apertured supports link 33. Initially the apertured members 31 and 32 are disc shaped and then curved diametrically with the substantially semi-cylindrical free ends thereof extending in axially spaced parallel relation. It is the curved portions of the members 31 and 32 that are back-to-back. The peripheral end of the members 31 and 32 diametrically opposite of the connection with the link 33 are free and not joined by any link. Thus, a folded-over tortilla T embraces the outer wall of the apertured member 31 (FIGS. 3 and 4), and another folded-over tortilla T embraces the outer wall of the apertured member 32. The tortillas initially have a disc configuration with a diameter substantially equal to the diameter of the members 31 and 32. When the tortillas are folded over and inserted into the device 10, they are supported respectively by the members 31 and 32. Therefore, the tortillas are in a folded-over shape while immersed for cooking in the cooking oil or the like.

The outer retainer 20 includes four semi-cylindrical apertured members 35 – 38 joined along their diametrical edges by substantially X-shaped retainer links 39 and 40. The diameter of the apertured members 35 – 38 are substantially the same as the diameters of the members 31 and 32. The axial distance that the members 35 and 36 are spaced apart is slightly greater than the depth of the folded-over tortillas and the depth of the member 31. Similarly, the axial distance that the members 37 and 38 are spaced apart is slightly greater than the depth of the folded-over tortillas and the depth of the member 32. The members 35 and 37 are in the same plane and have their diametrical edges spaced apart. Likewise, the members 36 and 38 are in the same plane and have their diametrical edges spaced apart. The apertured members 35 and 38 form a Z configuration. Similarly, the apertured members 36 and 37 form a Z configuration, but oppositely directed. Thus, a pair of tortillas are placed against the inner support 15 and are retained in position thereagainst by the outer retainer 20. The X-links 39 and 40 are at opposite ends of the diametrical edges of the members 35 – 38.

The handle 25 is connected to a shaft or rod 50 that is freely received by the aligned openings of the links 33, 39 and 40. One end of right angle arm 51 of the handle 25 is mounted to one end of the rod 50 and at the other end of the arm 51 is fixed a manually gripped member 52 of the handle 25.

For flipping the inner support 15 and the outer retainer simultaneously through 180° during each flip-over action, a right angle actuator arm or reciprocator 60 (FIGS. 2 and 3) is hooked to the link 33 offset from the center thereof. The upright portion of the arm 60 is received by a suitable opening in the manually gripped member 52 of the handle 25. The free end of the upright portion of the arm 60 is threaded and a knob 61 is tapped for connecting to the arm 60. A spring 62 surrounds the arm 60 and is disposed between the knob 61 and the manually gripped member 52. The depressing of the knob 61 lowers the arm 60 in the direction of an arrow 71 (FIG. 3), which in turn rotates the link 33 in the direction of the arrow 70 about the shaft 50 to rotate the inner support 15 and the outer retainer 20. When the knob 60 is released, the arm 60 is raised under the urgency of the spring 62 for continuing the rotation of the link 33 about the rod 50 in the direction of the arrow 70, which action serves to complete the rotation of the inner support 15 and the outer retainer 20 through 180°.

When the tortillas are cooked in a deep fry or oil, the deep fry or oil is contained in a skillet. If there is insufficient oil or deep fry in the skillet to immerse both tortillas T simultaneously, then it may be desirable to be able to rotate the inner support 15 and outer retainer 20 with facility and ease of operation.

While apertured members are shown for the inner support 15 and the outer retainer 20, it is apparent that wire frame members can be employed equally as well.

I claim:

1. Device for holding tortillas or the like during the cooking thereof comprising:

a. a first and second tortilla support disposed back-to-back for supporting respectively a folded-over tortilla;
b. a support link interconnecting said first and second supports back-to-back for concurrent movement;
c. a rod received by said support link for supporting said first and second supports for pivotal movement;
d. a first outer retainer spaced from said first support for retaining a folded-over tortilla in engagement with said first support;
e. a second outer retainer spaced from said second support for retaining a folded-over tortilla in engagement with said second support;
f. retainer links spaced apart along the axis of said rod and receiving said rod, said retainer links interconnecting said first and second outer retainers for supporting said first and second outer retainers for concurrent pivotal movement about the axis of said rod;
g. a handle connected to said rod for supporting said rod; and
h. actuating means carried by said handle and operative for imparting pivotal movement to said first and second supports and said first and second outer retainers in a flip-over action.

2. A device as claimed in claim 1 wherein said actuating means is connected to means for imparting pivotal movement to said first and second supports and said first and second outer retainers.

3. A device as claimed in claim 2 wherein said actuating means includes a spring loaded reciprocator displaceable relative to said handle for imparting pivotal movement to said first and second supports and said first and second outer retainers.

* * * * *